US008532252B2

(12) United States Patent
Nakamura

(10) Patent No.: US 8,532,252 B2
(45) Date of Patent: Sep. 10, 2013

(54) X-RAY SHIELD GRATING, MANUFACTURING METHOD THEREFOR, AND X-RAY IMAGING APPARATUS

(75) Inventor: Takashi Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 12/975,428

(22) Filed: Dec. 22, 2010

(65) Prior Publication Data

US 2011/0182403 A1 Jul. 28, 2011

(30) Foreign Application Priority Data

Jan. 27, 2010 (JP) ................................ 2010-015968

(51) Int. Cl.
*G01N 23/04* (2006.01)

(52) U.S. Cl.
USPC ............................ 378/36; 378/145; 378/154

(58) Field of Classification Search
USPC .................................... 378/62, 36, 145, 154
See application file for complete search history.

(56) References Cited

U.S. PATENT DOCUMENTS

| | | | | |
|---|---|---|---|---|
| 2005/0069089 | A1* | 3/2005 | Armstrong et al. | 378/162 |
| 2005/0111627 | A1* | 5/2005 | Leppert | 378/154 |
| 2007/0268586 | A1* | 11/2007 | Mimura et al. | 359/599 |
| 2009/0120904 | A1 | 5/2009 | Imada et al. | 216/41 |
| 2010/0246764 | A1 | 9/2010 | Itoh et al. | 378/62 |
| 2010/0290590 | A1* | 11/2010 | Ouchi et al. | 378/62 |
| 2011/0085639 | A1 | 4/2011 | Nakamura et al. | 378/62 |

OTHER PUBLICATIONS

C David et al., "Manufacture of Diffraction Gratings for Hard X-Ray Phase Contrast Imaging", *Microelectronic Engineering*, vol. 84 (2007), pp. 1172-1177.

* cited by examiner

*Primary Examiner* — Hoon Song
(74) *Attorney, Agent, or Firm* — Fitzpatrick, Cella, Harper & Scinto

(57) ABSTRACT

A two-dimensional X-ray shield grating which may be manufactured more easily and to a manufacturing method to provide therefor is provided. The method of manufacturing the X-ray shield grating includes: a first step of forming a plurality of columnar structures periodically arranged in two directions; and a second step of forming a film which surrounds at least side surfaces of the respective plurality of columnar structures, in which, in the second step, portions of the film formed on side surfaces of columnar structures which are adjacent to each other in the two directions among the plurality of columnar structures are connected to each other in the two directions, and in which the film is formed so that a columnar aperture is formed between columnar structures which are diagonally adjacent to each other with respect to the two directions among the plurality of columnar structures.

9 Claims, 4 Drawing Sheets

X-RAY SHIELD GRATING, MANUFACTURING METHOD THEREFOR, AND X-RAY IMAGING APPARATUS

BACKGROUND OF THE INVENTION

1. Field of the Invention

The present invention relates to an X-ray shield grating, a manufacturing method therefor, and an X-ray imaging apparatus.

2. Description of the Related Art

X-ray phase contrast imaging is a method of obtaining a phase image of a test object by detecting a phase shift of X rays. X-ray phase contrast imaging includes a method using Talbot interference. A method in which X-ray phase contrast imaging is performed using Talbot interference method is hereinafter referred to as an X-ray Talbot interference method.

FIG. 7 illustrates an exemplary structure of an imaging apparatus using the X-ray Talbot interference method. The imaging apparatus using the X-ray Talbot interference method generally includes an X-ray source 8 for emitting spatially coherent X rays, a diffraction grating 10 for periodically modulating phase of the X rays, an X-ray shield grating 11 in which shielding portions and transmitting portions of the X rays are periodically arranged, and a detector 12 for detecting the X rays.

First, a principle of the Talbot interference method is described in brief. When spatially coherent X rays are diffracted by the diffraction grating 10, an interference pattern referred to as a self-image is formed. When a test object 9 is disposed between the X-ray source 8 and the diffraction grating 10, X rays emitted from the X-ray source 8 are refracted by the test object 9. The X rays refracted by the test object 9 are diffracted by the diffraction grating 10. By detecting a self-image formed by the diffraction, a phase image of the test object 9 may be obtained. However, a period of the self-image formed here is smaller than a resolution of the detector 12. Therefore, the X-ray shield grating 11 in which the shielding portions for shielding against X rays and the transmitting portions for transmitting X rays are periodically arranged is disposed at a place at which the self-image is formed, and moiré is produced by overlaying the X-ray shield grating 11 on the self-image. Then, information on the phase shift of the X rays due to the test object 9 may be observed as the moiré by the detector 12.

In order to observe the moiré, it is necessary that the shielding portions of the X-ray shield grating 11 sufficiently shield against the X rays. In order to sufficiently shield against the X rays, thickness of the shielding portions need be large. However, the shielding portions need be arranged with a period of several micrometers, and thus, it is generally difficult to manufacture an X-ray shield grating having the shielding portions of large thickness.

Accordingly, various methods of manufacturing an X-ray shield grating have been proposed. For example, in Microelectronic Engineering, Volume 84 (2007), 1172-1177, a Si structure having a period twice as long as that of the X-ray shield grating is manufactured, and, by plating the Si structure with gold, an X-ray shield grating having a desired period is obtained.

SUMMARY OF THE INVENTION

In the method of manufacturing an X-ray shield grating disclosed in Microelectronic Engineering Volume 84 (2007), 1172-1177, a direction of the period of the Si structure which is twice as long as that of the X-ray shield grating is the same as a direction of a period of a structure which is finally obtained by being plated with gold. Therefore, in the above-mentioned method of manufacturing an X-ray shield grating, only a line-like X-ray shield grating having its period only in one dimension may be manufactured, and it is difficult to manufacture an X-ray shield grating having its period in two dimensions (hereinafter, referred to as a two-dimensional X-ray shield grating). The present invention is made in view of the above-mentioned problem, and an object of the present invention is to provide a two-dimensional X-ray shield grating which may be manufactured more easily and to provide a manufacturing method therefor.

According to an aspect of the present invention, an X-ray shield grating for use in an X-ray imaging apparatus is an X-ray shield grating including: a plurality of columnar structures periodically arranged in two directions; and a film surrounding at least side surfaces of the respective plurality of columnar structures, in which portions of the film which surround side surfaces of columnar structures which are adjacent to each other in the two directions among the plurality of columnar structures are connected to each other, and in which a columnar aperture on which sides are surrounded by the film is formed between columnar structures which are diagonally adjacent to each other among the plurality of columnar structures.

Further, according to another aspect of the present invention, manufacturing method the X-ray shield grating includes: a first step of forming a plurality of columnar structures periodically arranged in two directions; and a second step of forming a film which surrounds at least side surfaces of the respective plurality of columnar structures, in which, in the second step, portions of the film formed on side surfaces of columnar structures which are adjacent to each other in the two directions among the plurality of columnar structures are connected to each other in the two directions, and in which the film is formed so that a columnar aperture is formed between columnar structures which are diagonally adjacent to each other with respect to the two directions among the plurality of columnar structures.

Further features of the present invention will become apparent from the following description of an exemplary embodiment with reference to the attached drawings.

DESCRIPTION OF THE EMBODIMENT

An embodiment of the present invention is now described.

Figure 1:
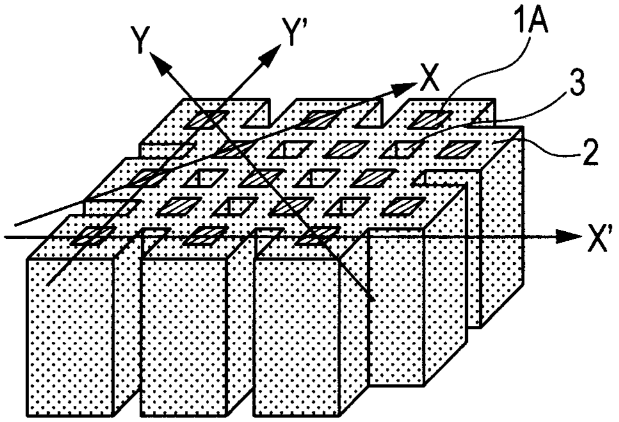
FIG. 1 is a schematic view of an X-ray shield grating according to an embodiment of the present invention.

As illustrated in FIG. 1, an X-ray shield grating according to this embodiment includes a plurality of columnar structures 1A which are periodically arranged with respect to two directions and a film 2 surrounding at least side surfaces of the plurality of columnar structures 1A.

Figure 2A:
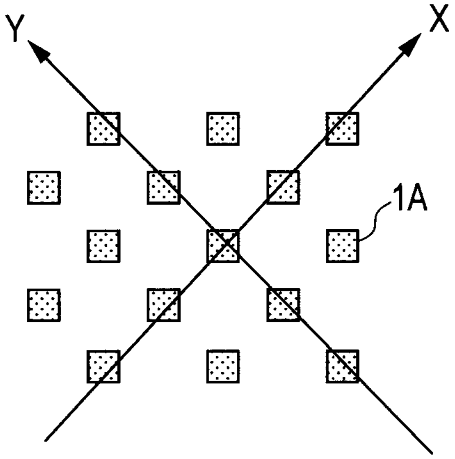
FIG. 2A is a sectional view taken along the plane perpendicular to long sides of columnar structures according to the embodiment of the present invention.
Figure 2B:
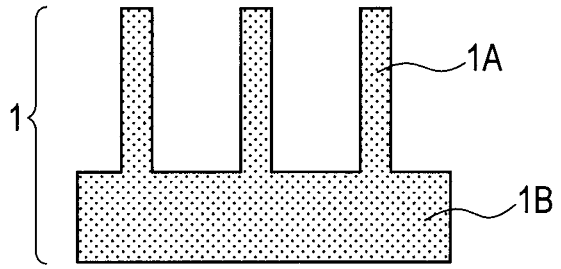
FIG. 2B is a sectional view taken along the plane in parallel with the long sides of the columnar structures according to the embodiment of the present invention.

The columnar structures 1A according to this embodiment are illustrated in FIGS. 2A and 2B. FIG. 2A is a sectional view taken along the plane perpendicular to long sides of the columnar structures 1A, while FIG. 2B is a sectional view taken along the plane in parallel with the long sides of the columnar structures 1A. The direction of the height of the columnar structures 1A seeing from the substrate is Hereinafter referred to as the direction of the "long sides". The columnar structures 1A illustrated in FIG. 2A are arranged at the same intervals in the plane perpendicular to the long sides of the columnar structures 1A so as to be in parallel with two directions (X direction and Y direction) which are not in parallel with each other. Note that, in the present invention, the phrase "the same" may have manufacturing tolerances insofar as imaging may be performed using the Talbot interference method. The two alignment directions of the columnar structures 1A illustrated in FIG. 2A are orthogonal to each other, but alignment directions which are not orthogonal to each other also fall within the scope of the present invention. Further, in the present invention intervals in the X direction and in the Y direction illustrated in FIG. 2A may not necessarily be the same. However, when the X-ray shield grating according to this embodiment is used as an X-ray shield grating of the X-ray Talbot interference method, more uniform moiré may be produced when the two alignment directions of the columnar structures are orthogonal to each other, and also more uniform moiré may be produced when alignment intervals of the columnar structures in the two directions are the same. As illustrated in FIG. 2B, the plurality of columnar structures 1A are supported by a supporting member 1B. The columnar structures 1A and the supporting member 1B are herein collectively referred to as a periodic structure 1. In FIG. 2B, the columnar structures 1A and the supporting member 1B are formed of the same material, but the columnar structures 1A and the supporting member 1B may be formed of different materials.

It is preferred that each of the columnar structures 1A be in the shape of a square in section taken along the plane perpendicular to the long sides of the columnar structures 1A and that a side of the square and the alignment directions of the columnar structures 1A form an angle of 45°. However, the shape in section is not limited to a square, and may be a rounded square or may be a polygon or a circle.

A material forming the periodic structure 1 is required to be such a material that the columnar structures 1A are easily manufactured, and, in addition, it is preferred that an X-ray absorption coefficient of the material be as small as possible. Si is a preferred material. Other than Si, resin materials such as polycarbonate (PC), polyimide (PI), and polymethyl methacrylate (PMMA), or glass may be used. A metal having a relatively small X-ray absorption coefficient, such as aluminum, may also be used.

The periodic structure 1 may be formed by using photolithography, dry etching, wet etching, nanoimprint lithography, or the like. After a resist pattern is formed by photolithography, dry etching or wet etching may be used to form the periodic structure 1, or, the columnar structures 1A may be formed of a photosensitive resist material on the supporting member 1B. Further, the supporting member 1B or a material formed as a film on the supporting member 1B may be processed by nanoimprint lithography, or, a mold may be formed of a Si structure and then the structure may be transferred to a resin material to form the columnar structures 1A.

Figure 3A:
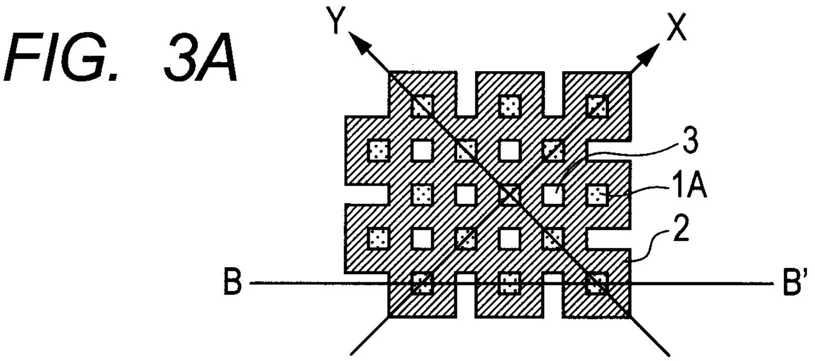
FIG. 3A is a sectional view taken along the plane perpendicular to the long sides of the columnar structures, illustrating the columnar structures and a film formed on side surfaces thereof according to the embodiment of the present invention.
Figure 3B:
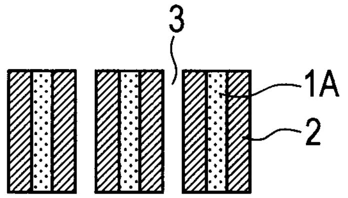
FIG. 3B is a sectional view taken along the plane in parallel with the long sides of the columnar structures, illustrating the columnar structures and the film formed on the side surfaces thereof according to the embodiment of the present invention.

The film 2 is formed on surfaces of the columnar structures 1A. FIGS. 3A and 3B illustrate the film 2. FIG. 3A is a sectional view taken along the plane perpendicular to the long sides of the columnar structures 1A, while FIG. 3B is a sectional view taken along the plane in parallel with the long sides of the columnar structures 1A. As illustrated in FIGS. 3A and 3B, the film 2 surrounds the columnar structures 1A. Further, as illustrated in FIG. 3A, by connecting films formed on side surfaces of adjacent columnar structures 1A in the X direction and in the Y direction which are the two alignment directions of the columnar structures 1A, columnar apertures 3 are formed between the columnar structures 1A which are adjacent to each other in a diagonal direction. However, the phrase "films are connected" as used herein refers to not only a state in which films are actually connected but also a state in which the films are so close to each other that, even if the films are not actually connected, the films may be regarded as being substantially connected. When the X-ray shield grating according to this embodiment is used in the X-ray Talbot interference method, it is enough that the films are so close to each other that moiré is produced by overlaying the X-ray shield grating on the self-image. Further, the phrase "columnar structures which are diagonally adjacent to each other" as used herein is defined as follows. First, a vector from a center of one columnar structure in one of the two alignment directions toward a center of a columnar structure adjacent to the one columnar structure, and a vector from the center of the one columnar structure in the other of the two alignment directions toward a center of a columnar structure adjacent to the one columnar structure, are assumed. Then, composition of the two vectors is performed. A columnar structure which is closest to the one columnar structure in a direction of the resultant vector is referred to as a columnar structure which is diagonally adjacent to the one columnar structure. The apertures 3 are surrounded on sides by the film 2.

A material of the film 2 is required to have an X-ray absorption coefficient which is larger than that of a material forming the columnar structures 1A. Exemplary preferred materials include noble metals such as gold, platinum, and silver, lead, bismuth, tungsten, and alloys thereof.

The film 2 may be formed by using electroplating, electroless plating, CVD, or the like. Of those methods, in order to form a metal layer having a thickness on the order of micrometers on a structure having a high aspect ratio, electroplating is preferred. However, when electroplating is used, if the columnar structures 1A are insulating, it is necessary to form a seed layer on surfaces thereof. The seed layer may be formed by using CVD, vapor deposition, sputtering, or electroless plating.

As described above, it is preferred that the intervals of the columnar structures 1A arranged in the X direction and in the Y direction be the same. When the intervals of the columnar structures 1A arranged in the two directions are the same, if the thickness of the film 2 is uniform, a line connecting a center of one columnar structure and a center of a columnar aperture which is closest to the one columnar structure forms an angle of 45° with the two alignment directions, respectively, of the columnar structures 1A. The columnar structures 1A and the columnar apertures 3 are the transmitting portions which transmit X rays, while the film 2 formed on the side surfaces of the columnar structures 1A is the shielding portions for shielding against X rays. However, the shielding portions are not required to completely shield against X rays. When the X-ray shield grating is used in the X-ray Talbot interference method, it is enough that shielding against X rays is carried out to an extent so that moiré is produced when the X-ray shield grating having the shielding portions is disposed at a place at which the interference pattern is formed.

In FIG. 3A, a period of the film 2 formed on the side surfaces of the columnar structures 1A on a straight line which forms an angle of 45° with an alignment direction of the columnar structures 1A (for example, a line B-B') is $1/\sqrt{2}$ of a period of the columnar structures 1A. When the X-ray shield grating according to this embodiment is used in the X-ray Talbot interference method, it is preferred that the widths of the columnar structure 1A, the film 2, and the aperture 3 on the line B-B' be 25%±2.5% of the period of the columnar structures 1A, and it is more preferred that the widths be 25% of the period. When the widths are different from 25% of the period, as the difference becomes larger, contrast of moiré fringes obtained by the Talbot interference becomes lower. Further, according to this embodiment, as illustrated in FIG. 3B, the film 2 is formed only on the side surfaces of the columnar structures 1A, but the film 2 may be formed also at tips of the columnar structures 1A and at the bottom of the apertures 3. Since thickness of the film formed at the tips of the columnar structures 1A and at the bottom of the apertures 3 is just the same as the thickness of the film formed on the side surfaces of the columnar structures 1A along the plane perpendicular to the long sides of the columnar structures 1A, when X rays are emitted from the direction of the long sides of the columnar structures 1A, the film sufficiently transmits the X rays. The tips of the columnar structures 1A and the bottom of the apertures 3 may have other structures formed thereon. For example, a flat plate formed of the same material as that forming the periodic structure 1 may be formed on the periodic structure 1 and a front surface and a rear surface or one of the two surfaces of the film 2.

Figure 4A:
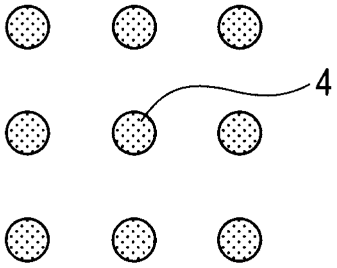
FIG. 4A is a sectional view taken along the plane perpendicular to long sides of cylindrical columnar structures which may be used as columnar structures according to the embodiment of the present invention.
Figure 4B:
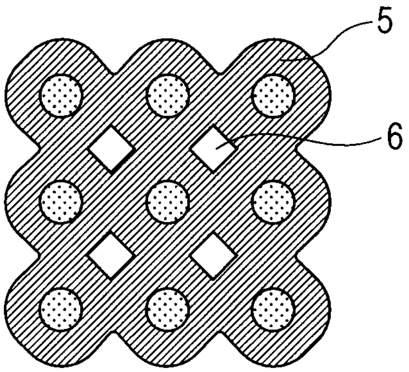
FIG. 4B is a sectional view taken along the plane perpendicular to the long sides of the columnar structures, illustrating the columnar structures and a film formed on side surfaces thereof according to the embodiment of the present invention when the cylindrical columnar structures are used.

Further, as illustrated in FIG. 4A, cylindrical columnar structures 4 may be used as the columnar structures. However, when a film 5 is formed on side surfaces of the cylindrical columnar structures 4 as illustrated in FIG. 4B, the apertures 6 become square-cornered in section, and thus, the shape of the cylindrical columnar structures 4 and the shape of the apertures 6, which are transmitting portions of X rays, are different from each other. Even when such grating is used, the X-ray Talbot interference method may be carried out, but, compared with a case in which all the transmitting portions of X rays are in the shape of a quadrangular prism, contrast of obtained moiré becomes lower.

Next, a method of manufacturing the X-ray shield grating according to this embodiment is described with reference to FIGS. 5A to 5D.

Figure 5A:
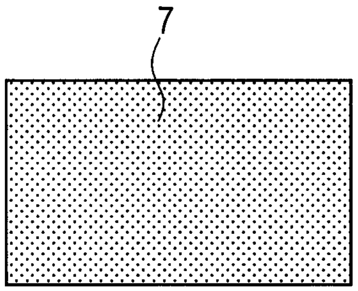
FIG. 5A is a view illustrating Step 1 of a method of manufacturing the X-ray shield grating according to the embodiment of the present invention.

First, in a step illustrated in FIG. 5A, a substrate 7 is prepared.

Figure 5B:
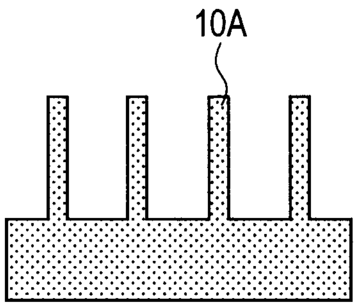
FIG. 5B is a view illustrating Step 2 of the method of manufacturing the X-ray shield grating according to the embodiment of the present invention.

Then, in a step illustrated in FIG. 5B, a part of a surface of the substrate 7 is processed to form columnar structures 10A. Alternatively, columnar structures may be formed using a different material on the surface of the substrate 7. In this way, a periodic structure is obtained.

Figure 5C:
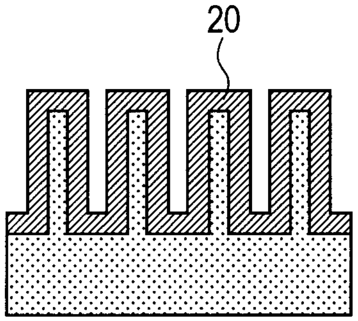
FIG. 5C is a view for illustrating Step 3 of the method of manufacturing the X-ray shield grating according to the embodiment of the present invention.

After that, in a step illustrated in FIG. 5C, a material having an X-ray absorption coefficient which is larger than that of the columnar structures 10A is used to form a film 20 on surfaces of the columnar structures 10A. The film 20 is formed so as to surround at least side surfaces of the columnar structures 10A, and may also be formed at the top of the columnar structures 10A and at the bottom of apertures as illustrated in FIG. 5C. The film may be formed by using electroplating. When the columnar structures 10A are formed of an insulating material, plating is given after a conductive film is formed on at least a part of the columnar structures 10A. Even when the columnar structures 10A are formed of a conductive material, if electrical connection is difficult, a conductive layer is additionally formed before plating.

Figure 5D:
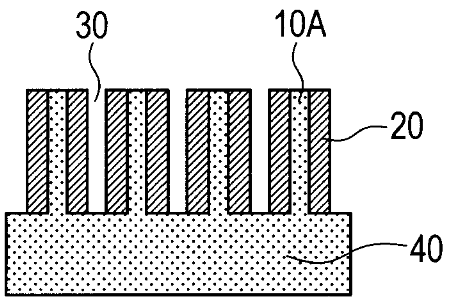
FIG. 5D is a view for illustrating Step 4 of the method of manufacturing the X-ray shield grating according to the embodiment of the present invention.

The structure in the step illustrated in FIG. 5C may be used as an X-ray shield grating for X-ray phase contrast imaging, or, the structure illustrated in FIG. 5C may be used after the film formed at the top of the columnar structures 10A and at the bottom of the apertures is removed by dry etching as in a subsequent step illustrated in FIG. 5D. By removing the film formed at the top of the columnar structures 10A and at the bottom of the apertures, when X rays are emitted from the direction of long sides of the columnar structures 10A, transmittance of X rays which pass through the columnar structures 10A and the apertures becomes higher than that before the film is removed. Therefore, the structure becomes suitable for the X-ray shield grating.

In the step illustrated in FIG. 5D, both the film formed at the top of the columnar structures 10A and the film formed over the supporting member are removed, but only the film formed at the top of the columnar structures 10A may be removed by polishing. Further, after a structure illustrated in FIG. 5D is formed, an unprocessed portion 40 of the substrate 7 may be removed.

EXAMPLES

Examples according to the present invention are now described.

Example 1

As Example 1, an example of manufacturing an X-ray shield grating having a period of 4 μm is described.

As a substrate, a Si wafer was used. A photosensitive material which was spin coated on a surface of the wafer was used to carry out desired patterning. After that, dry etching was performed to form columnar structures having an equal period in two-dimensional directions as illustrated in FIGS. 2A and 2B. Individual columnar structures which were formed were squares of 2×2 μm when cut along the plane perpendicular to long sides of the columnar structures and had a period of 5.6 μm in each of the X direction and Y direction that were orthogonal to each other. Further, the columnar structures had a height of 50 μm. After that, a Ti film was formed at a thickness of 10 nm at tips of the Si columnar structures by vapor deposition, which was followed by formation of a Au film at a thickness of 200 nm.

Gold plating was given with the obtained Ti/Au layer being as a seed layer. Au1101 manufactured by Electroplating Engineers of Japan Ltd. (EEJA), which was an electroplating solution containing gold sulfite as metal salt, was used as the electroplating solution. Gold plating was given with the temperature of the electroplating solution being 60 degrees at 0.5 $mA/cm^2$, and the thickness of gold at the tips of the Si columnar structures was 2 μm. In this way, a periodic structure with its surface coated with gold as illustrated in FIG. 5C was obtained. The Si—Au hybrid structure was observed from the direction of long sides of the Si columnar structures with an X-ray microscope. Gold which was deposited on side surfaces of Si periodically blocked X rays, and the period of the blockage was 4 μm. Further, the direction of a period of transmitting portions of X rays and the direction of a period of the Si columnar structures formed an angle of 45°. Next, by dry etching with regard to the whole surface using Ar, gold at the top of the Si columnar structures and over the supporting member was removed. In this way, the structure as illustrated in FIG. 5D was obtained, which was a gold periodic structure that could be used as the X-ray shield grating having a period of 4 μm.

Example 2

As Example 2, an example of manufacturing an X-ray shield grating having a period of 8 μm is described.

As a substrate, a Si wafer was used. A photosensitive material was spin coated on a surface of the wafer. Similarly to the case of Example 1, desired patterning was carried out and dry etching was performed to form columnar structures. Individual columnar structures which were formed were squares of 4×4 μm when cut along the plane perpendicular to long sides of the columnar structures and were arranged with a period of 11.3 μm in the X direction and Y direction that were orthogonal to each other. After that, in a method similar to that in Example 1, a gold layer having a thickness of 4 μm was formed by gold plating, and gold at the top of the Si columnar structures and over the supporting member was removed by dry etching using Ar. Then, the Si substrate was removed by dry etching using $CF_4$. In this way, a gold periodic structure was obtained that could be used as the X-ray shield grating having a period of 8 μm.

Next, an imaging apparatus according to this embodiment is described with reference to FIG. 6.

Figure 6:
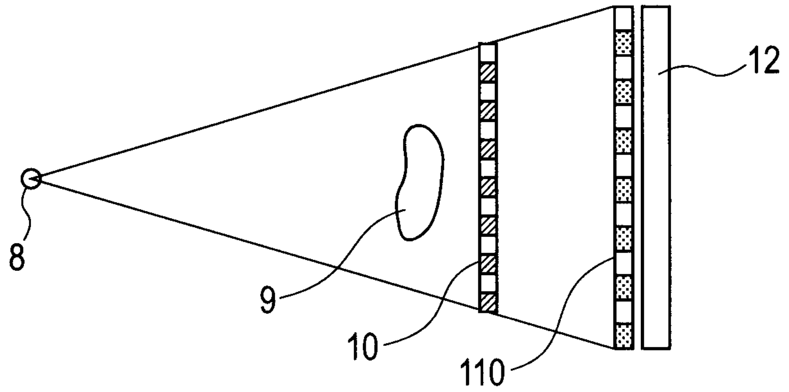
FIG. 6 is a structural view of an X-ray Talbot interferometer according to the embodiment of the present invention.
Figure 7:
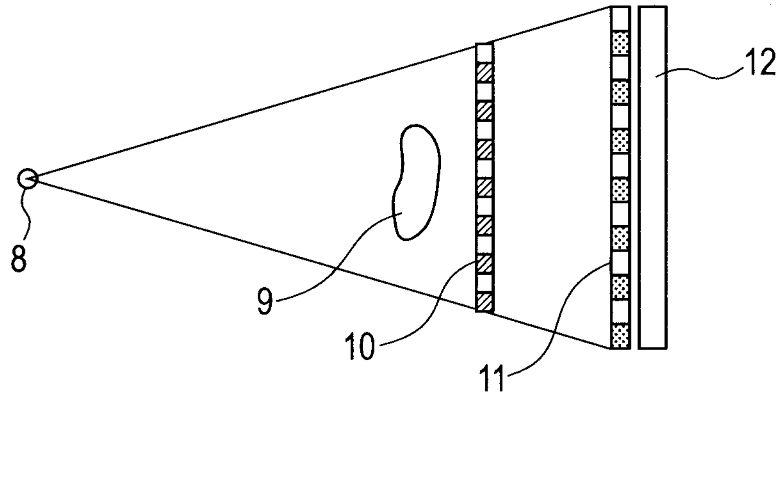
FIG. 7 PRIOR ART
FIG. 7 is a structural view of a conventional X-ray Talbot interferometer.

FIG. 6 is a structural view of an imaging apparatus using the X-ray shield grating manufactured in Example 2. The imaging apparatus of this example includes an X-ray source 8 for emitting spatially coherent X rays, a diffraction grating 10 for periodically modulating phase of the X rays, an X-ray shield grating 110 according to the above-mentioned embodiment of the present invention, and a detector 12 for detecting the X rays. When a test object 9 is disposed between the X-ray source 8 and the diffraction grating 10, information on a phase shift of the X rays due to the test object 9 was detected as moiré by the detector 12. In other words, the imaging apparatus imaged the test object 9 by imaging the moiré which had phase information of the test object 9. By performing phase retrieval processing such as Fourier transformation based on the result of the detection, a phase image of the test object 9 was able to be obtained. In the imaging apparatus according to this embodiment, the X-ray shield grating which could be manufactured more easily was used, and thus, defects in the X-ray shield grating were reduced and the test object 9 was able to be imaged with higher precision accordingly.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-015968, filed Jan. 27, 2010, which is hereby incorporated by reference herein in its entirety.

What is claimed is:

1. A method of manufacturing an X-ray shield grating comprising:

a first step of forming a plurality of columnar structures periodically arranged in two directions; and a second step of forming a film, which has an X-ray absorption coefficient that is larger than that of the plurality of columnar structures, on at least side surfaces of the respective plurality of columnar structures, wherein, in said second step, portions of the film formed on side surfaces of columnar structures which are adjacent to each other in the two directions among the plurality of columnar structures are connected to each other in the two directions, and wherein, in said second step, the film is formed so that a columnar aperture is formed between columnar structures which are diagonally adjacent to each other with respect to the two directions among the plurality of columnar structures.

2. A method of manufacturing an X-ray shield grating according to claim 1, further comprising removing portions of the film which are formed at tips of the plurality of columnar structures and at a bottom of the columnar apertures.

3. An X-ray shield grating comprising:

a plurality of columnar structures periodically arranged in two directions; and a film surrounding at least side surfaces of the respective plurality of columnar structures, wherein said film has an X-ray absorption coefficient that is larger than that of said plurality of columnar structures, wherein portions of said film which surround side surfaces of columnar structures which are adjacent to each other in the two directions among said plurality of columnar structures are connected to each other, and wherein a columnar aperture on which sides are surrounded by said film is formed between columnar structures which are diagonally adjacent to each other among said plurality of columnar structures.

4. An X-ray shield grating according to claim 3, wherein the two directions are orthogonal to each other.

5. An X-ray shield grating according to claim 3, wherein a line connecting a center of one columnar structure among said plurality of columnar structures and a center of the aperture which is closest to said one columnar structure form an angle of 45° with an alignment direction of said plurality of columnar structures.

6. An X-ray shield grating according to claim 3, wherein each of said plurality of columnar structures is in a shape of a square in section, and wherein a side of said square and a direction of a period of said plurality of columnar structures form an angle of 45°.

7. An X-ray shield grating according to claim 3, wherein each of said plurality of columnar structures is in a shape of a circle in section.

8. An imaging apparatus for imaging a test object, comprising:

an X-ray source;

a diffraction grating for diffracting X rays emitted from said X-ray source;

the X-ray shield grating according to claim 3 for shielding against a part of the X-rays diffracted by said diffraction grating; and a detector for detecting the X-rays that have passed through said X-ray shield grating.

9. An X-ray shield grating according to claim 3, wherein said plurality of columnar structures have an X-ray absorption coefficient that is larger than that of said columnar aperture.

* * * * *